US010955241B2

(12) United States Patent
Turalba

(10) Patent No.: US 10,955,241 B2
(45) Date of Patent: Mar. 23, 2021

(54) AIRCRAFT IMAGING SYSTEM USING PROJECTED PATTERNS ON FEATURELESS SURFACES

(71) Applicant: Aurora Flight Sciences Corporation, a subsidiary of The Boeing Company, Manassas, VA (US)

(72) Inventor: Jose Antonio Turalba, Cambridge, MA (US)

(73) Assignee: Aurora Flight Sciences Corporation, Manassas, VA (US), a subsidiary of The Boeing Company (*) Notice: Subject to any disclaimer, the term of this patent is extended or adjusted under 35 U.S.C. 154(b) by 0 days.

(21) Appl. No.: 16/453,635

(22) Filed: Jun. 26, 2019

(65) Prior Publication Data

US 2020/0408518 A1 Dec. 31, 2020

(51) Int. Cl.
| | | |
|---|---|---|
| *G01C 11/02* | (2006.01) | |
| *G06T 7/521* | (2017.01) | |
| *G06T 7/33* | (2017.01) | |
| *B64D 47/08* | (2006.01) | |
| *G02B 26/10* | (2006.01) | |
| *G03B 15/00* | (2021.01) | |
| *H04N 5/225* | (2006.01) | |

(52) U.S. Cl.
CPC ............ *G01C 11/025* (2013.01); *B64D 47/08* (2013.01); *G02B 26/10* (2013.01); *G03B 15/006* (2013.01); *G06T 7/33* (2017.01); *G06T 7/521* (2017.01); *H04N 5/2253* (2013.01); *B64C 2201/123* (2013.01)

(58) Field of Classification Search
CPC .................................................... G01C 11/025
See application file for complete search history.

(56) References Cited

U.S. PATENT DOCUMENTS

| | | | |
|---|---|---|---|
| 5,912,739 A | 6/1999 | Fowler et al. | |
| 10,029,804 B1* | 7/2018 | Chamberlain | ............ G06T 7/11 |
| 2017/0201738 A1* | 7/2017 | Lacaze | ................ G01S 7/4813 |
| 2018/0088581 A1* | 3/2018 | Freeman | ............... B64C 39/024 |
| 2019/0011529 A1* | 1/2019 | Choi | ..................... B64C 39/024 |
| 2019/0066317 A1 | 2/2019 | Chang et al. | |

(Continued)

FOREIGN PATENT DOCUMENTS

WO  WO1999058930 A1  11/1999

OTHER PUBLICATIONS

Sims-Waterhouse et al., "Verification of Micro-Scale Photogrammetry for Smooth Three-Dimensional Object Measurement," Measurement Science and Technology, vol. 26, Issue 5, Feb. 2017, 12 pages.

(Continued)

*Primary Examiner* — Girumsew Wendmagegn
(74) *Attorney, Agent, or Firm* — Yee & Associates, P.C.

(57) ABSTRACT

A method, apparatus, and system for processing images. A featureless surface is detected during at least a portion of a flight of an aircraft. A pattern is displayed in a fixed location on the featureless surface while the featureless surface is in a field of view of a camera system carried by the aircraft during at least the portion of the flight of the aircraft. Images of the featureless surface with the pattern in the fixed location using the camera system are generated during at least the portion of the flight of the aircraft.

27 Claims, 7 Drawing Sheets

(56) References Cited

U.S. PATENT DOCUMENTS

| | | | |
|---|---|---|---|
| 2019/0094344 A1 | 3/2019 | Steinmann et al. | |
| 2019/0193852 A1* | 6/2019 | Wang | G06K 9/0063 |
| 2019/0346269 A1* | 11/2019 | Mohr | G01C 21/165 |

OTHER PUBLICATIONS

Sims-Waterhouse et al., "Experimental Comparison of Photogrammetry for Additive Manufactured Parts with and without Laser Speckle Projection," SPIE Optical Metrology, Proceedings vol. 10329, Munich, Germany, 2017, 7 pages.

"r/photogrammetry: Tips for flat featureless surfaces and surface that have some specular sheen," posted by u/disguisesinblessing, accessed May 31, 2019, 4 pages. https://www.reddit.com/r/photogrammetry/comments/3wncs0/tips_for_flat_featureless_surfaces_and_surfaces/.

Adam Technology, Description, accessed Jun. 25, 2019, 5 pages. https://www.adamtech.com.au/3dm/3dmdescription.html.

Gomez-Gutierrez et al., "Does HDR Pre-Processing Improve the Accuracy of 3D Models Obtained by Means of two Conventional SfM-MVS Software Packages? The Case of the Corral del Veleta Rock Glacier," Remote Sensing, vol. 7, Published Aug. 2015, 26 pages. https://www.mdpi.com/2072-4292/7/8/10269/htm.

Extended European Search Report, dated Oct. 27, 2020, regarding Application No. 20180304.6, 8 pages.

\* cited by examiner

AIRCRAFT IMAGING SYSTEM USING PROJECTED PATTERNS ON FEATURELESS SURFACES

BACKGROUND INFORMATION

1. Field

The present disclosure relates generally to aerial imaging systems and in particular, generating models of terrain and objects using images of the terrain and objects generated by an aerial imaging system. Still more particularly, the present disclosure relates to a method, apparatus, and system for generating images of a featureless surface by a camera system carried on an aircraft in a manner that is useable for generating models.

2. Background

Photogrammetry is the use of photography to make measurements. Photogrammetry uses images in surveying and mapping to measure distances between objects. For example, photogrammetry can be used to plot contour lines on topographic maps. Photogrammetry can also be used to create point cloud models for three dimensional models of an environment. For example, a point cloud model can be generated from photographs of crops in a field, a park, a city block, a stadium, terrain, or other objects of interest.

An aircraft with a camera system can fly over a region, such as a park, a field with crops, a city, or other region. The aircraft generates images of the region in which overlaps are present in the images of the region. The features in the overlapping areas are used to accurately triangulate and identify key points in the images as part of a process to generate a model.

An issue occurs when the region includes an area with a featureless surface. For example, roof tops of buildings with the same color can result in images of the roof tops that have featureless surfaces. As another example, a runway can have a featureless surface. As a result, undesired errors in triangulation performed to determine distances between features during point cloud generation can occur for these portions of the region that have featureless surfaces.

These featureless surfaces can appear as empty regions in a point cloud model, produce inaccurate ghosting and distortion in the point cloud, or both appear as empty regions in a point cloud and produce inaccurate ghosting and distortion in the point cloud model.

Therefore, it would be desirable to have a method and apparatus that take into account at least some of the issues discussed above, as well as other possible issues. For example, it would be desirable to have a method and apparatus that overcome a technical problem with using photogrammetry to generate models of regions in which featureless surfaces are present.

SUMMARY

An embodiment of the present disclosure provides an aerial imaging system comprising a camera system, a surface detector, and a laser projector system. The camera system is carried by an aircraft and has a field of view for generating images during at least a portion of a flight of the aircraft. The surface detector is carried by the aircraft and detects a featureless surface. The laser projector system is carried by the aircraft and a group of laser beams to display a pattern on the featureless surface in a fixed location on the featureless surface during at least the portion of the flight of the aircraft when the featureless surface is in the field of view of the camera system.

Another embodiment of the present disclosure provides an aerial imaging system comprising a controller in a computer system in communication with a laser projector system and a camera system. The controller controls operation of the laser projector to emit a group of laser beams to display a pattern in a fixed location on a featureless surface in a field of view of the camera system during at least a portion of a flight of an aircraft. The controller controls operation of the camera system to generate images of the featureless surface with the pattern in the field of view during at least the portion of the flight of the aircraft.

Yet another embodiment of the present disclosure provides a method for processing images. A featureless surface is detected during at least a portion of a flight of an aircraft. A pattern is displayed in a fixed location on the featureless surface while the featureless surface is in a field of view of a camera system carried by the aircraft during at least the portion of the flight of the aircraft. Images of the featureless surface with the pattern in the fixed location using the camera system are generated during at least the portion of the flight of the aircraft.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that adding one or more features to a surface that is featureless can provide the points or landmarks that allow for a desired level of accuracy for creating a model, such as a point cloud for an area that has one or more featureless surfaces.

The illustrative embodiments recognize and take into account that one manner in which features can be added to a featureless surface is through the display of a pattern on the featureless surface such that the camera system generates images of featureless surface that includes overlapping images of the featureless surface with the pattern.

Thus, the illustrative embodiments provide a method, apparatus, and system for processing images to create models. In one illustrative example, an aircraft carries a camera system and a laser projector system. The laser projection system emits a group of laser beams to display a pattern on the featureless surface in a fixed location on the featureless surface during the flight of the aircraft when the featureless surface is in the field of view of the camera system. As used herein, a "group of" when used with reference to items means one or more items. For example, a group of laser beams is one or more laser beams.

The laser projection system adjusts the emission of the group of laser beams such that the pattern remains at the same location during the flight of the aircraft. The camera system generates images of the featureless surfaces with the pattern. At least some of the images of the featureless surface with the pattern overlap with other images of the featureless surface with the pattern. The images of the featureless surface with the pattern can also overlap images of the featureless surface without a pattern. In other words, the pattern may cover a portion of the featureless surface instead of all of the featureless surface.

This pattern in the images provides the features needed to align the images with each other for purposes of generating a model such as a point cloud model. For example, overlapping portions of images with the pattern can be more easily processed using photogrammetry techniques to triangulate distances within the featureless surface. The displayed pattern on the featureless surface provides visual features that can be identified and used for triangulation and for generating point clouds. In this manner, in an illustrative example, the point cloud models generated with the featureless surfaces can be more accurate as compared to currently used techniques.

Figure 1:
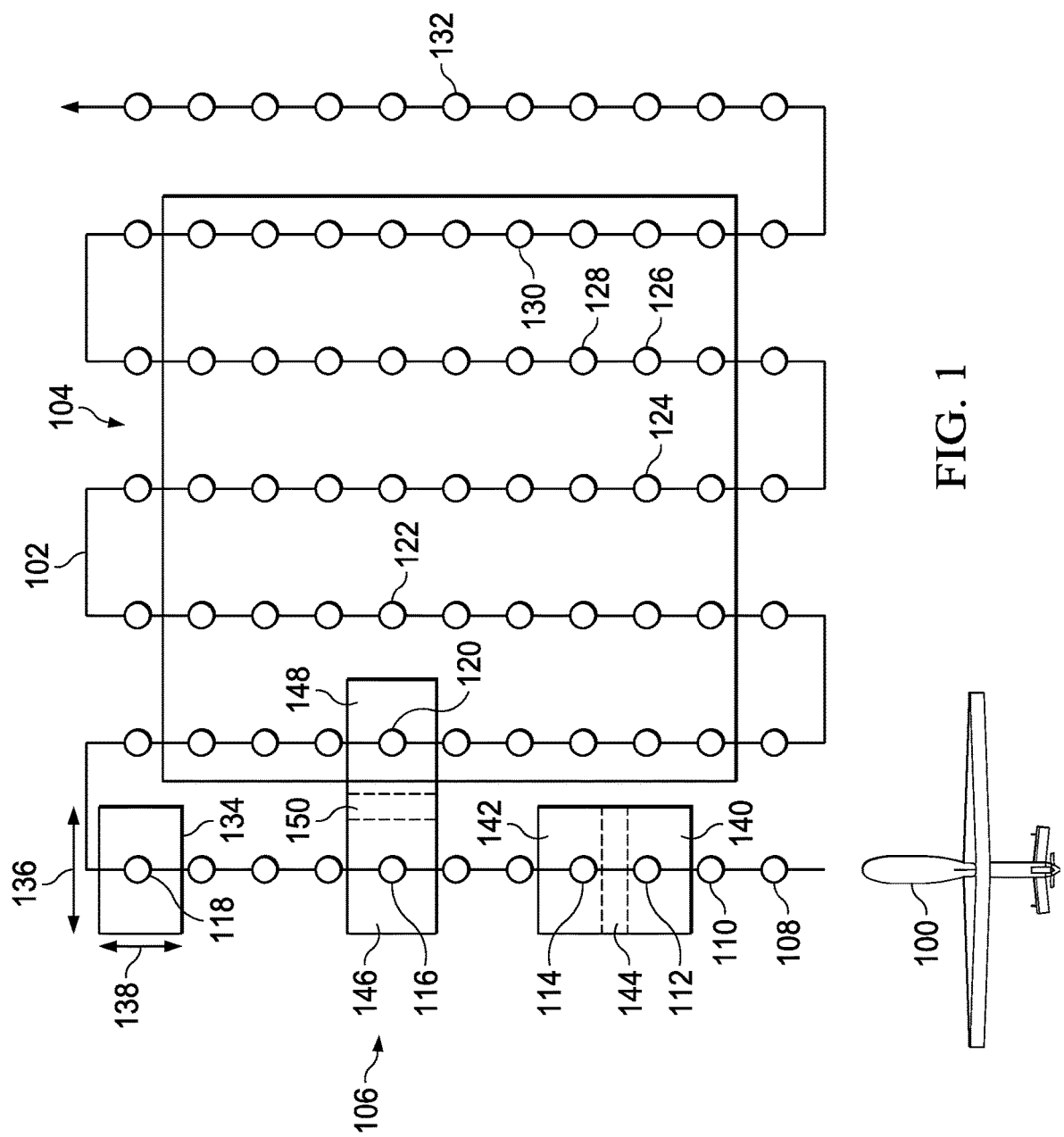
FIG. 1 is an illustration of image generation by an aerial imaging system in accordance with an illustrative embodiment.

With reference now to the figures in particular with reference to FIG. 1, an illustration of image generation by an aerial imaging system is depicted in accordance with an illustrative embodiment. In this illustrative example, aircraft 100 travels along flight path 102 As depicted, flight path 102 results in aircraft 100 flying over region of interest 104.

In this illustrative example, aircraft 100 generates images while traveling along flight path 102. As expected, an image is generated at each waypoint in waypoints 106. For example, aircraft 100 generates an image waypoint 108, waypoint 110, waypoint 112, waypoint 114, waypoint 116, waypoint 118, waypoint 120, waypoint 122, waypoint 124, waypoint 126, waypoint 128, waypoint 130, and waypoint 132 in waypoints 106.

In this depicted example, each image has the same dimensions. For example, image 134 has width 136 and height 138.

As depicted, flight path 102 results in overlap between images. For example, image 140 generated at waypoint 112 and image 142 generated at waypoint 114 have a frontal overlap in frontal overlap area 144. This overlap occurs as aircraft 100 travels along flight path 102 from one waypoint to another waypoint. As another example, image 146 generated at waypoint 116 and image 148 generated at waypoint 120 have a side overlap in side overlap area 150.

These overlapping areas are used to align images with each other when producing a model of region of interest 104 from the images generated at waypoints 106. The alignment of the images can be performed based on features in these overlapping areas between the images. Features in overlapping areas of adjacent images can be used to triangulate camera locations in generating a model.

In the illustrative example, features are, for example, textures, colors, corners, edges, contrasting patterns or shading. For example, as long as the surface creates at least one of a different pixel color or pixel value when light reaches the camera sensor, the surface can be considered to have features in this illustrative example.

Featureless surfaces can reduce the ability to accurately triangulate and identify features in images. As a result, inaccuracy occurs in performing triangulation for featureless surfaces in these images.

For example, identifying key points is more difficult than desired when a large section of pixels is present in which the pixels are of almost the same value. For example, an image of a roof on a building can have many areas of the same color. As a result, triangulating points that are the same in multiple images can be very difficult or almost impossible because a texture is not present to use as a reference.

Thus, some of the images for different portions of region of interest 104 are unusable. The featureless surfaces can appear as empty portions in a point cloud model and can result in inaccuracies and distortions in the point cloud model generated from these images.

However, in this illustrative example, aircraft 100 is part of the aerial imaging system that includes a camera system carried by aircraft 100. The camera system has a field of view for generating images during at least a portion of a flight of aircraft 100 along flight path 102.

Additionally, a surface detector is carried by aircraft 100. The surface detector detects a featureless surface prior to the featureless surface entering the field of view for the camera system during at least the portion of the flight of aircraft 100 along flight path 102.

Furthermore, a laser projector system is carried by aircraft 100. The laser projector system emits a group of laser beams to display a pattern on the featureless surface in a fixed location on the featureless surface during at least the portion of the flight of the aircraft when the featureless surface is in the field of view of the camera system. As used herein, a "group of" when used with reference to items means one or more items. For example, a group of laser beams is one or more laser beams.

In the illustrative example, the projection of the pattern on the featureless surface enables the featureless surface from images of the featureless surface generated by aircraft 100 to be reconstructed in a model using photogrammetry techniques. The projection of the pattern also improves edge detection and accuracy photogrammetric mapping using images of the featureless surface generated by the camera system carried by aircraft 100. The pattern provides features that can be identified in the images to generate a model in which the featureless surface can be modeled more accurately as compared to current photogrammetric techniques.

In this illustrative example, the display of the pattern on the featureless surface can be made while aircraft 100 flies over waypoint 116 to generate image 146. The projection of the pattern can stop until aircraft 100 approaches and reaches waypoint 120 along flight path 102. In this depicted example, the projection can stop of the pattern when the detector does not find any more featureless surfaces traveling along flight path 102 when turning around the corner and coming back from waypoint 116 to waypoint 120.

At waypoint point 120 or right before waypoint 120, the pattern is displayed in the same fixed location as when aircraft 100 was at waypoint 116.

In this illustrative example, the change in position of aircraft 100 is tracked such that the pattern can be displayed in the same location when aircraft 100 reaches waypoint 120 as when aircraft 100 was in waypoint 116. In this illustrative example, aircraft 100 can track information such as position, as in, velocity, and other information for using in displaying the pattern in the same location on the featureless surface even with movement of aircraft 100. The position includes the location of three dimensions as well as an orientation of aircraft 100.

Figure 2:
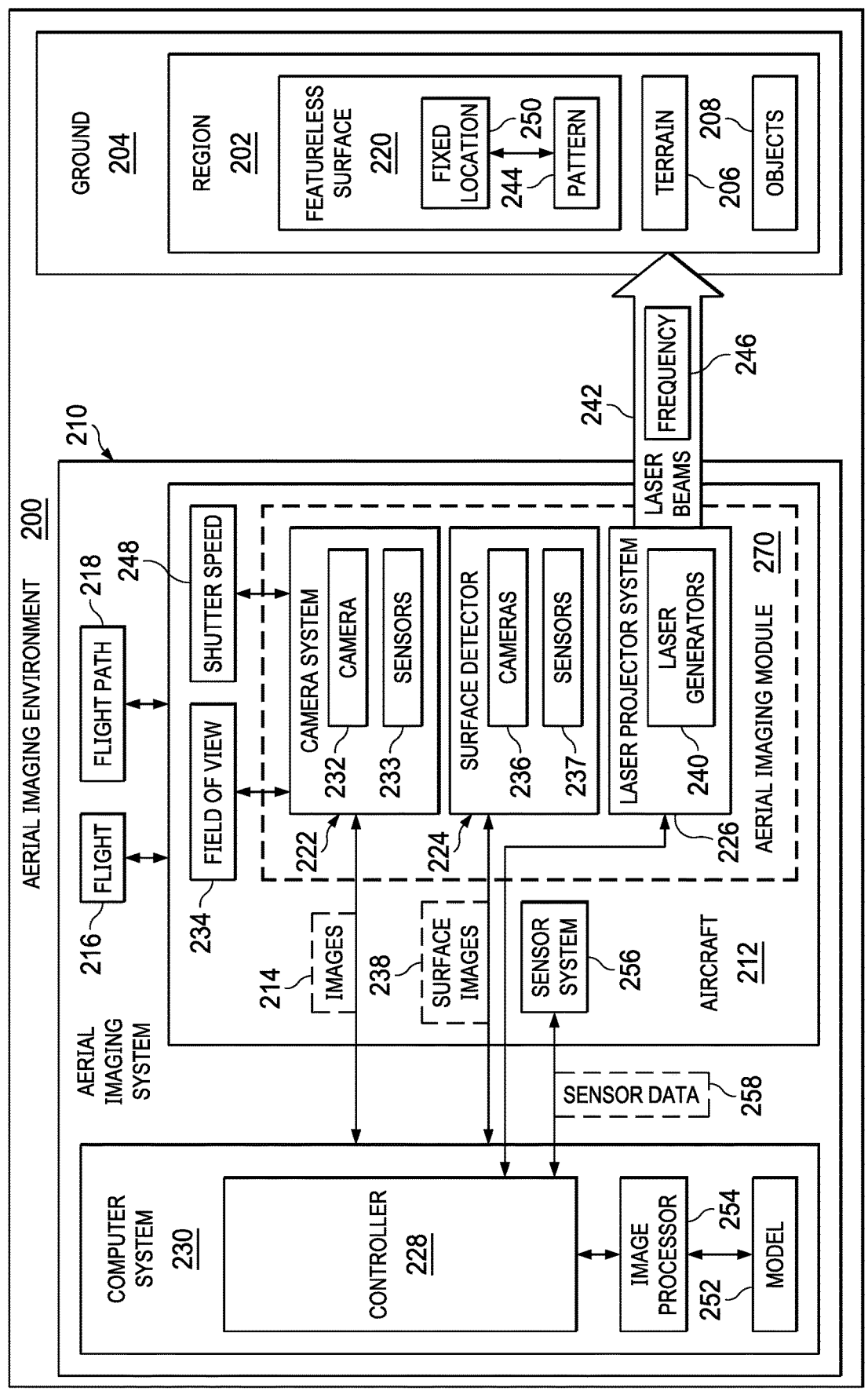
FIG. 2 is an illustration of a block diagram of an aerial imaging environment in accordance with an illustrative embodiment.

With reference next to FIG. 2, an illustration of a block diagram of an aerial imaging environment is depicted in accordance with an illustrative embodiment. In this illustrative example, aerial imaging environment 200 includes region 202. As depicted, region 202 is a region of interest on ground 204. In this illustrative example, ground 204 is an area of land, water, or some combination thereof. Region 202 can have any shape or size. For example, region 202 can have a shape that is a rectangle, a square, a circle, an oval, a pentagon, a hexagon, an irregular shape, or some other suitable shape.

Region 202 can include terrain 206 and can also include objects 208. Objects 208 can comprise at least one of a vehicle, a road, a building, a tree, a person, an animal, a boulder, a wall, a sign, or other suitable objects. Region 202 with terrain 206 and objects 208 can encompass at least one of a field with crops, a park, a stadium, an airport, a city block, an office complex, a manufacturing facility, a dam, or some other suitable objects.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In this illustrative example, one or more components in aerial imaging system 210 can be carried by aircraft 212 to generate images 214 of region 202 during at least a portion of flight 216 of aircraft 212. As depicted, aerial imaging system 210 can generate images 214 of region 202 while traveling along flight path 218 over region 202. In this example, region 202 includes featureless surface 220. In this depicted example, flight 216 is present when aircraft 212 is operating in the air, and flight path 218 is the route that aircraft 212 travels on while operating in the air.

Aircraft 212 can take a number of different forms. For example, aircraft 212 can be selected from a group comprising aircraft comprising a manned aircraft, an airplane, an unmanned aerial system, a rotorcraft, and other suitable types of aircraft.

In this illustrative example, featureless surface 220 in region 202 can take a number of different forms. For example, featureless surface 220 can be located on at least one of terrain 206 or an object in objects 208.

As depicted, aerial imaging system 210 is a physical hardware system and can also include software. In this illustrative example, aerial imaging system 210 includes camera system 222, surface detector 224, and laser projector system 226. In this illustrative example, aerial imaging system 210 also includes controller 228 in computer system 230.

Camera system 222 is a physical hardware system and can also include software. Camera system 222 includes at least one of a group of cameras 232 or a group of optical sensors 233. Camera system 222 has field of view 234. The group of optical sensors 233 can be at least one of an ultraviolet sensor, a visible sensor, a near-infrared sensor, a short wave infrared sensor, a mid-wave infrared sensor, a long wave infrared (LWIR) sensor, a bolometer, an electro-optical camera, infrared sensor, a thermal sensor, or some suitable type of sensor.

As depicted, field of view 234 for camera system 222 is comprised of the field of use for the group of cameras 232. In this illustrative example, field of view 234 is the extent of the observable environment that can be seen by camera system 222 at any given moment. For example, field of view 234 for camera system 222 can be an angle through which a group of sensors in camera system 222 is sensitive to electromagnetic radiation such as light when generating images 214.

In this illustrative example, camera system 222 generates images 214 of region 202 that is within field of view 234 of camera system 222. Images 214 includes featureless surface 220 in region 202.

As depicted, surface detector 224 is a physical hardware system and can also include software. Surface detector 224 generates surface images 238.

Surface detector 224 includes at least one of a group of cameras 236 or a group of sensors 237. The group of sensors 237 can be at least one of an ultraviolet sensor, a visible sensor, a near-infrared sensor, a short wave infrared sensor, a mid-wave infrared sensor, a long wave infrared (LWIR) sensor, a bolometer, an electro-optical camera, infrared sensor, a thermal sensor, or some suitable type of sensor.

In this illustrative example, a computer vision process can analyze surface images 238 to determine whether featureless surface 220 is present in any of surface images 238. For example, the computer vision process can recognize similar pixels within a threshold in determining whether the surface is a featureless surface in an image. These thresholds can be for at least one of intensity or color for the pixels.

For example, the analysis can be made for pixels within a 100×100 square of pixels with respect to intensity, color, or both. If the similarities are within a selected threshold, the surface in the image within that square can be considered a featureless surface.

Surface detector 224 identifies featureless surface 220 during at least a portion of flight 216 of the aircraft 212. In the illustrative example, surface detector 224 detects featureless surface 220 prior to featureless surface 220 entering field of view 234 for camera system 222.

In this illustrative example, laser projector system 226 is a physical hardware system and can include software. Laser projector system 226 includes a group of laser generators 240 that emit the group of laser beams 242. A laser generator in the group of laser generators 240 can comprise a mirror system, a group of laser diodes, and a mirror controller. The group of laser diodes can be directed at the micro electro-mechanical systems mirror. The mirror controller can move the mirror system such that a group of laser diodes emit the group of lasers beams 242 to display the pattern on featureless surface 220.

The mirror system can comprise a number of different types of mirrors. For example, the mirror system can include at least one of a micro electromechanical systems mirror, a polygonal scanning mirror, or other suitable types of mirrors.

The group of laser beams 242 emitted from laser projector system 226 can move to scan a surface to generate pattern 244. In the illustrative example, pattern 244 is displayed by laser projector system 226 with frequency 246 that is greater than shutter speed 248 of camera system 222.

As depicted, a laser projector system 226 emits a group of laser beams 242 to display pattern 244 on featureless surface 220 in fixed location 250 on featureless surface 220 during at least a portion of flight 216 of aircraft 212. In this illustrative example, the projection of laser beams 242 to display pattern 244 on featureless surface 220 is made when featureless surface 220 is in field of view 234 of camera system 222. In this illustrative example, pattern 244 is selected to provide features in images 214 that can be used to generate model 252 of region 202.

Pattern 244 can be selected from at least one of a random pattern, a pseudo-random pattern, a random interference pattern, a noise function based pattern, a speckle pattern, a geometric pattern, a two-dimensional pattern, or some other suitable pattern that increases the accuracy in generating model 252 from images 214 when featureless surface 220 is present in region 202.

In this illustrative example, laser projector system 226 adjusts the emission of the group of laser beams 242 to take into account movement of aircraft 212 such that pattern 244 remains in fixed location 250 on featureless surface 220 as aircraft 212 moves relative to featureless surface 220. In this illustrative example, laser projector system 226 is in communication with sensor system 256 in aircraft 212.

Sensor system 256 can include at least one of a global positioning system receiver, an altimeter, an inertial navigation system, an accelerometer, a rotation sensor, a gyroscope, a camera, or other suitable types of sensors that can generate information used to determine location, orientation, and movement of aircraft 212 relative to fixed location 250 on featureless surface 220. Sensor system 256 can generate sensor data 258 that includes at least one of an altitude, a location in longitude and latitude, an attitude, a velocity, acceleration, or other suitable information that can be used to determine the location and movement of aircraft 212 relative to fixed location 250 on featureless surface 220.

In this illustrative example, controller 228 in computer system 230 is in communication with at least one of camera system 222, surface detector 224, or laser projector system 226. Controller 228 controls operation of at least one of camera system 222, surface detector 224, or laser projector system 226.

As depicted, controller 228 can be implemented in software, hardware, firmware or a combination thereof. When software is used, the operations performed by controller 228 can be implemented in program code configured to run on hardware, such as a processor unit. When firmware is used, the operations performed by controller 228 can be implemented in program code and data and stored in persistent memory to run on a processor unit. When hardware is employed, the hardware can include circuits that operate to perform the operations in controller 228.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices.

Computer system 230 is a physical hardware system and includes one or more data processing systems. When more than one data processing system is present in computer system 230, those data processing systems are in communication with each other using a communications medium. The communications medium can be a network. The data processing systems can be selected from at least one of a computer, a server computer, a tablet computer, or some other suitable data processing system.

In the illustrative example, image processor 254 can be implemented in software, hardware, firmware or a combination thereof. Image processor 254 can be located in a number of different locations. For example, image processor can be located in at least one of a ground location or aircraft 212. In the illustrative example, image processor 254 can be distributed in more than one location.

As depicted in this example, image processor 254 operates to generate model 252 using images 214. Model 252 can take a number of different forms. For example, model 252 can be a two-dimensional model, a three-dimensional model, a contour map, a photographic map, a point cloud model, a computer-aided design model, and other suitable types of models.

In the illustrative example, the components in aerial imaging system 210 can be integrated as part of aircraft 212 or can be a removable platform that can be removably attached to aircraft 212. For example, camera system 222, surface detector 224, and laser projector system 226 can be implemented in aerial imaging module 270. Aerial imaging module 270 can be an external pod that is attached to aircraft 212, an internal component carried by aircraft 212, or some combination thereof with this type of implementation.

In one illustrative example, one or more technical solutions are present that overcome a technical problem with using photogrammetry to generate models of regions from images in which featureless surfaces are present. As a result, one or more technical solutions can provide a technical effect enabling the generation of images of featureless surfaces during flight of an aerial imaging system in which these images can be processed to generate more accurate models as compared to current techniques. One or more illustrative examples provide one or more technical solutions in which a pattern is displayed on the featureless surface using an imaging system such as a laser projector system during flight of an aerial imaging system. One or more illustrative examples provide a technical solution in which images of the featureless surface with the pattern can be processed using photogrammetry to generate a model that include the featureless surface with a greater level of accuracy as compared to current techniques for generating models in which a pattern is not displayed on the featureless surface during flight of an aerial imaging system.

Computer system 230 can be configured to perform at least one of the steps, operations, or actions described in the different illustrative examples using software, hardware, firmware or a combination thereof. As a result, computer system 230 operates as a special purpose computer system in which controller 228 in computer system 230 generated models of the ground including featureless surface with a desired level of accuracy. In particular, controller 228 transforms computer system 230 into a special purpose computer system as compared to currently available general computer systems that do not have controller 228.

In the illustrative example, the use of controller 228 in computer system 230 integrates processes into a practical application for processing images that increases the performance of computer system 230. The performance increase is an increase in accuracy of models generated from images using photogrammetry. In other words, controller 228 in computer system 230 is directed to a practical application of processes integrated into controller 228 in computer system 230 displays a pattern on a featureless surface such that the generation of images of the featureless surface include the pattern.

In this illustrative example, controller 228 in computer system 230 detects a featureless surface during at least a portion of flight 216 of aircraft 212; projects pattern 224 in fixed location 250 on featureless surface 220 while featureless surface 220 is in field of view 234 of camera system 222 carried by aircraft 212 during at least a portion of flight 216 of aircraft 212; and generates images 214 of featureless surface 220 with pattern 244 in fixed location 250 using camera system 222 during at least a portion of flight 216 of aircraft 212. In this manner, controller 228 in computer system 230 provides a practical application of generating images of featureless surfaces that can be used to generate models with a desired level of accuracy.

Figure 3:
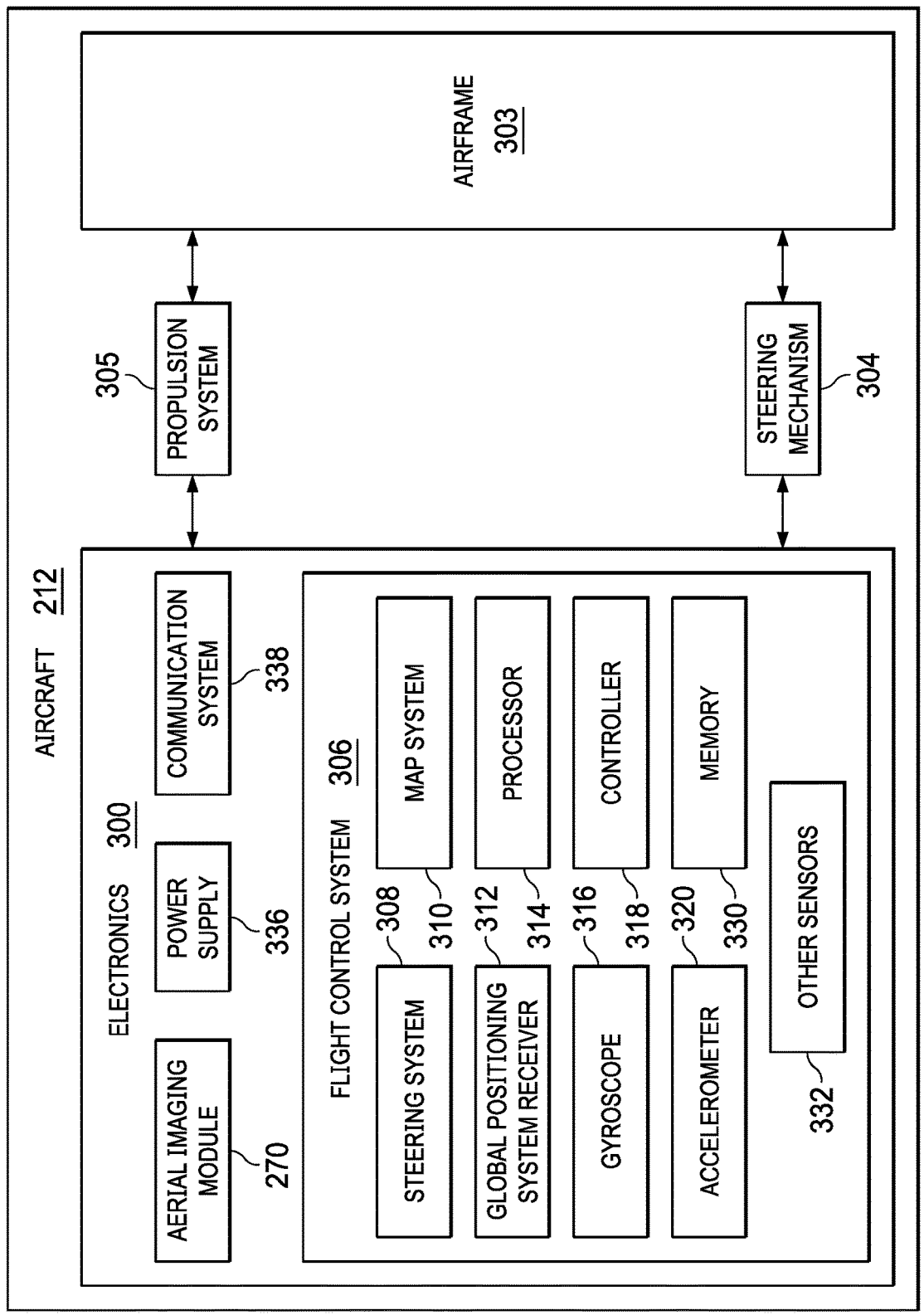
FIG. 3 is an illustration of a block diagram of an aircraft and its components in accordance with an illustrative embodiment.

FIG. 3 is an illustration of a block diagram of an aircraft depicted in accordance with an illustrative embodiment. In the illustrative examples, the same reference numeral may be used in more than one figure. This reuse of a reference numeral in different figures represents the same element in the different figures. This figure shows one possible implementation for aircraft 212 in FIG. 2.

In this illustrative example, aircraft 212 includes airframe 303, electronics 300, propulsion system 305, and steering mechanism 304. Airframe 303 is a mechanical structure for aircraft 212. Airframe 303 can include, for example, a fuselage, an undercarriage, wings, landing gear, and other physical structures. In this illustrative example, airframe 303 carries electronics 300, propulsion system 305, and steering mechanism 304.

As depicted, electronics 300 includes aerial imaging module 270, power supply 336, communication system 338, and flight control system 306. In this depicted example, aerial imaging module 270 includes a framework or housing that carries camera system 222, surface detector 224, and laser projector system 226 as illustrated in FIG. 2.

Although a particular arrangement of components is illustrated in FIG. 3, the arrangement of components may vary in other illustrative examples. For example, aerial imaging module 270 can may be located within one or more housings that are removable from aircraft 212. Alternatively, components in aerial imaging module 270 can be integrated into the aircraft 212 instead of being placed in a housing that is attached to aircraft 212 or placed in aircraft 212.

Further, at least one of aerial imaging module 270, flight control system 306, or communication system 338 can share components, such as memory, sensors, processors, or controllers. Additionally, aerial imaging module 270 can be removably coupled to the aircraft 212 or components in this module can be integrated into airframe 303 for aircraft 212 in any desired manner. Thus, the arrangement of the various components may be configured as desired by the designer or operator and therefore should not be limited to a particular example described or illustrated herein.

In this illustrative example, the modular housing for aerial imaging module 270 can be constructed of plastic, metal, wood, a composite material, ceramic, or any material suitable for the purposes of a particular vehicle or type of vehicle. The modular housing may be detachable or ejectable, or it may be permanently coupled to the vehicle. The modular housing may be attached to aircraft 212 in any manner known to one of ordinary skill in the art. The modular housing may include openings for devices such as camera system 222, surface detector 224, and laser projector system 226 in aerial imaging module 270. In some illustrative examples, controller 228 can also be located in aerial imaging module 270 or can be located in flight control system 306 or in some other suitable component within aircraft 212.

Although this example shows these components as being located in a housing for aerial imaging module 270, this illustration is for purposes of illustrating one manner in which these components can be implemented. This illustration is not meant to limit the manner in which other illustrative examples can be implemented. For example, these components can be distributed in other locations or integrated as part of aircraft 212 in other illustrative examples.

In this illustrative example, steering mechanism 304 can be configured to steer the aircraft on a flight path to reach an objective. Steering mechanism 304 can be operated autonomously or under manned control. In this illustrative example, steering mechanism 304 responds to signals from controller 318 in flight control system 306, which may employ feedback or other control systems to direct the aircraft 212 along a flight path.

As depicted, communication system 338 is a physical device and may be, for instance, a wireless transceiver and antenna. Communication system 338 can exchange information with a remote computer system. Communication system 338 can operate to send images 214 generated by aerial imaging module 270 to a remote location for processing or model generation. For example, communication system 338 can send images 214 to image processor 254 at ground location.

When implemented in aircraft 212, image processor 254 can perform model generation and other processes such as photogrammetry, model generation, and other operations performed as post processing operations that occur after the generation of images 214 can be performed on aircraft 212. By performing these operations on aircraft 212, data output speeds in image processing and model generation can be greatly improved by avoiding the need to download and process images 214 at ground location.

As depicted, flight control system 306 can determine one or more flight paths for the aircraft 212 to reach a desired location based upon signals received from the components of a navigation system. Flight control system 306 can calculate, generate, and send navigation commands, such as data signals, to the steering mechanism 304 to direct the aircraft 212 along a flight path.

In this illustrative example, flight control system 306 includes map system 310, global positioning system (GPS) receiver 312, processor 314, gyroscope 316, controller 318, accelerometer 320, and memory 330. Flight control system 306 may also include the components described above as being part of electronics 300, as well as other sensors 332. For example, other sensors 332 can also include other flight instrumentation, sensors, processing circuitry, communications circuitry, an optical system including cameras and other sensor that are necessary or useful for operation of an unmanned aerial system or other autonomously or manually piloted aircraft.

As depicted, map system 310 can be part of a map-based flight control system that provides positional information about natural and manmade features within a region. Map system 310 can communicate with other components in flight control system 306 to support navigation of aircraft 212. While this function can include providing map information for calculation of routes, this function can also include independent navigational capabilities. For example, the map system 310 can provide a map-based navigation system that stores a map of an operating environment including one or more objects. The map-based navigation system may be coupled to cameras and configured to determine a position of a vehicle by comparing stored objects to a visible environment, which may provide position data in the absence of global positioning system data or other positional information.

In this example, global positioning system receiver 312 is a physical system and can be part of a global positioning system configured to determine a position of aircraft 212. Global positioning system receiver 312 can include any currently used global positioning system hardware, including conventional, satellite-based systems as well as other systems using beacons, positional signals, and or other sources of positioning information.

As depicted, gyroscope 316 is a physical device configured to detect rotation of aircraft 212. Gyroscope 316 can communicate with the other components in the flight control system 306 to control operation of aircraft 212 and navigate aircraft 212 along a flight path. Gyroscope 316 can generate information that identifies an orientation of aircraft 212.

In the illustrative example, accelerometer 320 is a physical device configured to detect a linear motion of aircraft 212. Accelerometer 320 can include currently used accelerometers and can communicate with the other components in flight control system 306 to control operation of aircraft 212 and navigate aircraft 212 along a flight path.

In this illustrative example, processor 314 is a physical device and can be in communication with controller 318, other components in flight control system 306, steering mechanism 304, aerial imaging module 270, and the other various other components, systems, and subsystems that may be present in aircraft 212. Processor 314 can be an internal processor in a data processing system such in aircraft 212 to support the various such as navigational functions or image processing functions. Processor 314 can be configured to control operation of at least one of aircraft 212, flight control system 306, or aerial imaging module 270.

As depicted, processor 314 can perform processing and calculation functions to support at least one of navigation, generating images, displaying a pattern on featureless surface, or processing images to generated models. Processor 314 may include a number of different processors cooperating to perform the steps described herein, such as where an internal processor in aircraft 212 controls operation of aircraft 212 while another processor assigned to aerial imaging module 270 controls the detecting featureless surfaces, displaying a pattern on featureless surfaces, and generating images of the featureless surfaces with the pattern.

In one illustrative example, processor 314 can be configured to determine a direction for laser projector system 226 to emit the group of laser beams 242 onto featureless surface 220. Processor 314 can determine the direction for emitting the group of laser beams 242 to display pattern 244 on featureless surface 220 using a variety of inputs. These inputs include at least one of position information, movement information, or other suitable information from global positioning system receiver 312, map system 310, gyroscope 316, accelerometer 320, and other suitable sensor devices including an optical system and an echolocation system. Further, information from these components can also be used by processor 314 to adjust an emission of the group of laser beams 242 to take into account movement of aircraft 212 such that pattern 244 remains in fixed location 250 on featureless surface 220 as aircraft 212 moves relative to featureless surface 220.

Controller 318 can operate to control components in aircraft 212 such as flight control system 306, aerial imaging module 270, propulsion system 305, or steering mechanism 304. Controller 318 is in communication with processor 314, the aircraft 212, the flight control system 306, aerial imaging module 270, steering mechanism 304, and the other various components of the devices and systems described herein. Controller 318 can also control the operation of aerial imaging module 270. This control can be in addition to or in place of the control described with respect to processor 314.

As depicted, controller 318 can include any hardware, software, or some combination thereof for controlling the various components in aircraft 212 and the flight control system 306 described herein, including, without limitation, microprocessors, microcontrollers, application-specific integrated circuits, programmable gate arrays, and any other digital and/or analog components, as well as combinations thereof, along with inputs and outputs for communicating control signals, drive signals, power signals, sensor signals, and other suitable types of signals.

Thus, processor 314, controller 318, and other components in flight control system 306 in electronics 300 can also provide information and control the operation of aerial imaging module 270. For example, these components can control aerial imaging module 270 to detect featureless surface 220, direct the emission of the group of laser beams 242 to display pattern 244 on features surface 220, and generate images 214 of featureless surface 220 with pattern 244 displayed on featureless surface 220.

In this illustrative example, memory 330 is a physical device and can include local memory or a remote storage device that stores a log of data for the flight control system 306, including, without limitation, images 214 generated by aerial imaging module 270, models generated from images 214, orientations, speeds, flight paths, steering specifications, global positioning system coordinates, sensor readings, and other suitable information. The information stored in memory 330 can be accessed by at least one of processor 314 or controller 318 in this example.

The illustration of aerial imaging environment 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

In yet another illustrative example, the emission of the group of laser beams 242 from laser projector system 226 can also be adjusted to take into account movement of featureless surface 220 in addition to or in place of movement of aircraft 212. For example, featureless surface 220 may be located on an object such as a vehicle such as a surface ship, a truck, a train, or some other object that moves. This movement can be determined using various object tracking techniques are currently available to track the movement of objects.

As yet another example, the group of laser generators 240 in laser projector system 226 can use other mechanisms for scanning the group of laser beams 242 in addition to or in place of mirrors. For example, scanning refractive optics, a phased array, electro-optic deflectors, acousto-optic deflectors, or other suitable types of scanning mechanisms can be used.

Further, although computer system 230 is shown as a separate block from aircraft 212, some or all of computer system 230 can be implemented in aircraft 212. For example, controller 228 can be implemented in one or more computing devices in computer system 230 that is carried by aircraft 212. With this example, image processor 254 can be located on a computing device that is in a remote location to aircraft 212 or carried by aircraft 212.

In still another illustrative example, region 202 can have one or more featureless surfaces in addition to or in place of featureless surface 220. A pattern is projected on each featureless surface for the purposes of generating images that include the featureless surface. The pattern displayed can be varied between featureless surfaces to enhance the ability to distinguish and align images.

In yet another example, aircraft 212 in FIG. 3 can include other components in addition to the components depicted. Aircraft 212 can also include a hydraulic system. As another example, aircraft 212 can also include an environmental system when aircraft 212 is a manned aircraft.

Figure 4:
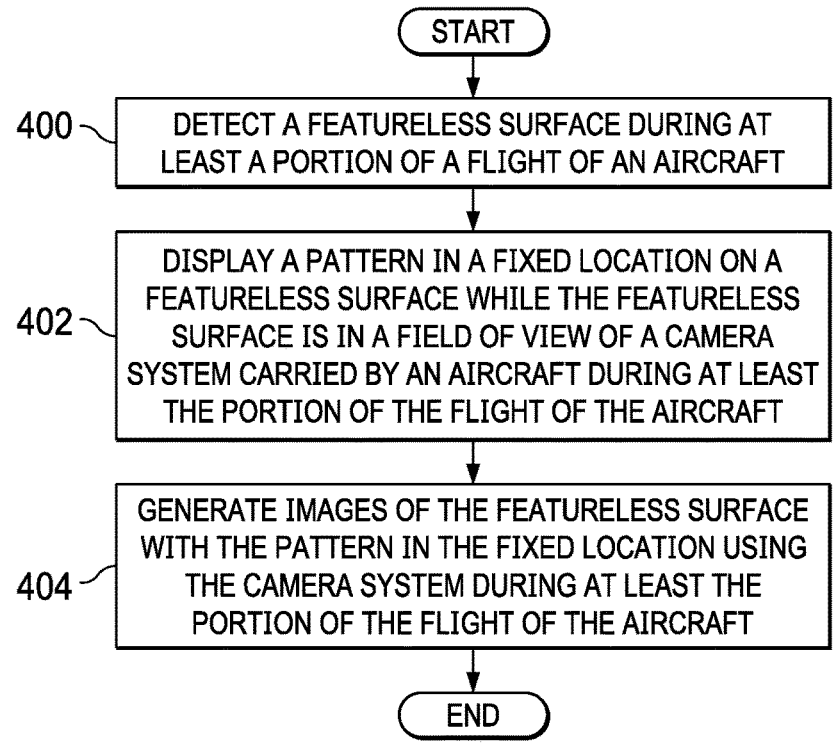
FIG. 4 is an illustration of a flowchart of a process for processing images in accordance with an illustrative embodiment.

Turning next to FIG. 4, an illustration of a flowchart of a process for processing images is depicted in accordance with an illustrative embodiment. The process in FIG. 4 can be implemented in hardware, software, or both. When implemented in software, the process can take the form of program code that is run by one or more processor units located in one or more hardware devices in one or more computer systems. For example, the process can be implemented in controller 228 in computer system 230 in FIG. 2. In this illustrative example, controller 228 controls the operation of a camera system, a surface detector, and a laser projection system carried by aircraft.

The process begins by detecting a featureless surface during at least a portion of a flight of an aircraft (operation 400). In operation 400, detecting a presence of the featureless surface can be performed prior to the featureless surface entering the field of view of the camera during at least a portion of the flight of the aircraft.

The process displays a pattern in a fixed location on a featureless surface while the featureless surface is in a field of view of a camera system carried by an aircraft during at least a portion of the flight of the aircraft (operation 402). In operation 402, laser projector system adjusts an emission of the group of laser beams to take into account movement of the aircraft such that the pattern remains in the fixed location on the featureless surface as the aircraft moves relative to the featureless surface.

The process generates images of the featureless surface with the pattern in the fixed location using the camera system during at least a portion of the flight of the aircraft (operation 404). The process terminates thereafter. In operation 404, the images are generated using a camera system in the aerial imaging system.

Figure 5:
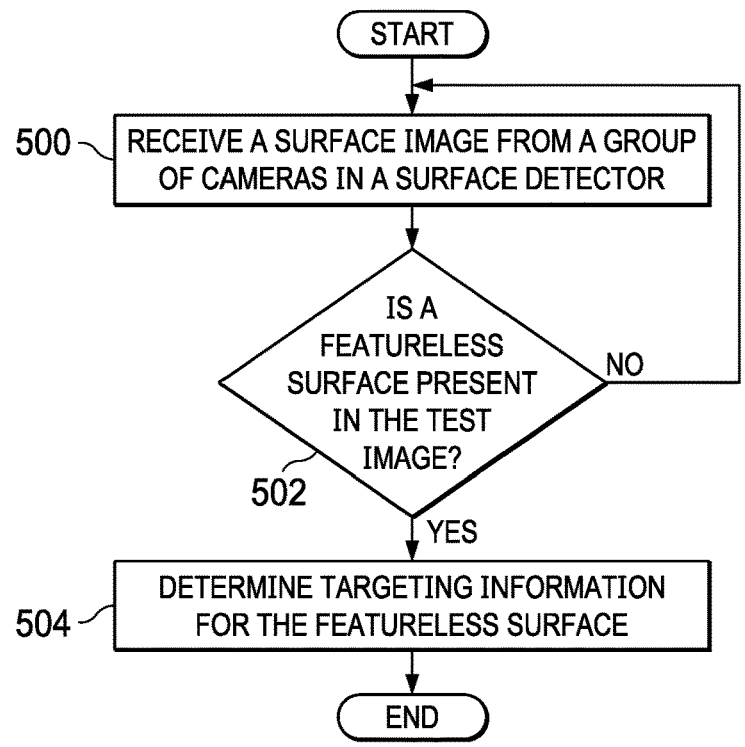
FIG. 5 is an illustration of a flowchart of a process for detecting a featureless surface in accordance with an illustrative embodiment.

With reference to FIG. 5, an illustration of a flowchart of a process for detecting a featureless surface is depicted in accordance with an illustrative embodiment. The process in FIG. 5 can be implemented in hardware, software, or both. When implemented in software, the process can take the form of program code that is run by one or more processor units located in one or more hardware devices in one or more computer systems. For example, the process can be implemented in controller 228 in computer system 230 in FIG. 2. Controller 228 can include a process for detecting featureless images in which the process is located in a surface detector or in another location in a computer system. Controller 228 can analyze surface images 238 generated by one or more cameras in a surface detector to detect the presence of a featureless surface. Further, controller 228 can determine a location of the featureless surface The process begins by receiving a surface image from a group of cameras in a surface detector (operation 500). The surface image in operation 500 can be a surface image in surface images 238 in FIG. 2. The process determines whether a featureless surface is present in the test image (operation 502). Operation 502 can be performed in a number of different ways. For example, the process can implement computer vision techniques to detect the presence of a featureless surface in the image.

In this operation, the test image can have a group of parameters within a threshold that indicates that the featureless surface is present at the fixed location. For example, the image can be divided into groupings of pixels. Each of these groupings in the test image can be examined to determine whether a featureless surface is present in the grouping being analyzed.

For example, a 100×100 square of pixels in the test image can be examined to determine whether the group of pixels are within a threshold for parameters, such as color and intensity. For example, if the values for at least one of color or intensity are the pixels are different from each other within a threshold, a featureless surface is present. In other words, if the difference in intensity, color, or intensity and color between the pixels in the group of pixels is small enough, a featureless surface is present.

If a featureless surface is present, the process determines targeting information for the featureless surface (operation 504). The targeting information can be, for example, a target position, dimensions of the target, velocity of the aircraft, distance of the target from the aircraft and other suitable information that can be used to display the pattern on the featureless surface In this depicted example, the laser beam is initially directed to the featureless surface by the detector system.

Once the area is identified, the vector to the featureless surface can be determined using the pixel coordinates of the featureless surface in the images captured by the detection system. Once the featureless surface is identified in the image, the relationship between the lens optical geometry and image sensor (a known quantity for a given camera system) can be used to provide a direction vector from the aircraft to the featureless surface.

The process terminates thereafter. With reference again to operation 502, if a featureless surface is not detected, the process returns to operation 500 to receive another test image for processing.

Figure 6:
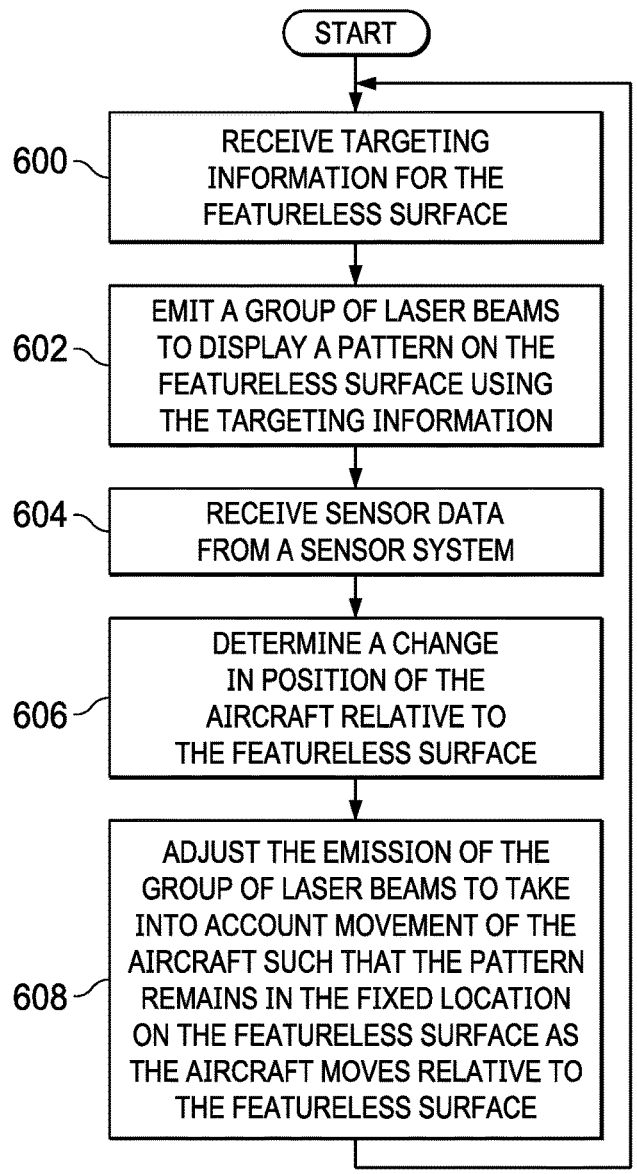
FIG. 6 is an illustration of a flowchart of a process for displaying a pattern on a featureless surface in accordance with an illustrative embodiment.

With reference now to FIG. 6, an illustration of a flowchart of a process for displaying a pattern on a featureless surface is depicted in accordance with an illustrative embodiment. The process in FIG. 6 can be implemented in hardware, software, or both. When implemented in software, the process can take the form of program code that is run by one or more processor units located in one or more hardware devices in one or more computer systems. For example, the process can be implemented in controller 228 in computer system 230 in FIG. 2. Controller 228 can include a process for displaying a pattern on a featureless surface using a laser projector. In this illustrative example, the pattern is displayed on a location on the featureless surface. In other words, as an aircraft carrying the laser projector system moves, the emission of the group of laser beams is adjusted such that the pattern does not move on the featureless surface.

The process begins by receiving targeting information for the featureless surface (operation 600). The process emits a group of laser beams to display a pattern on the featureless surface using the targeting information (operation 602). The process receives sensor data from a sensor system (operation 604). The process determines a change in position of the aircraft relative to the featureless surface (operation 606). The position of the aircraft is a three-dimensional location and orientation of the aircraft and in particular the laser projector system. The three-dimensional location can be described using coordinates in a three-dimensional coordinate system such as a cartesian coordinate system or a geographic coordinate system that include elevation or altitude.

The process adjusts the emission of the group of laser beams to take into account movement of the aircraft such that the pattern remains in the fixed location on the featureless surface as the aircraft moves relative to the featureless surface (operation 608). In operation 608, a basic targeting technique can be used to take into account movement of aircraft. For example, vector addition and target state estimation can be performed using an Extended Kalman Filter. For example, a boat in a current will travel in a direction that is the sum of the current and the boat speed.

In this illustrative example, the angle and relative position between the aircraft and target, a fixed location on the featureless surface, is a constantly changing variable subject to the quantities for targeting information. The targeting information can include (a) a relative velocity vector between the aircraft and the ground where the surface is located; (b) an angle and slant range between the aircraft vertical vector and featureless surface. (can be determined using Time-Of-Flight Light sensor, or geometry); (c) an aircraft attitude (Roll/Pitch/Yaw) in relation to the surface (provided by aircraft sensor/inertial navigation system); and (d) an aircraft altitude above surface (an be determined using Time-of-Flight light sensor/pitostatic system/inertial navigation/GPS).

This above information, as well as information from other sources can be input into an Extended Kalman Filter function to produce a more accurate estimate of the target position, as well as a forward prediction of the target's future position. The output from the Extended Kalman Filter will inform the laser's initial position, and produce increased tracking performance over basic vector addition.

The process returns to operation 600. The process continues as long as the pattern is to be displayed on the featureless surface at the fixed location.

Figure 7:
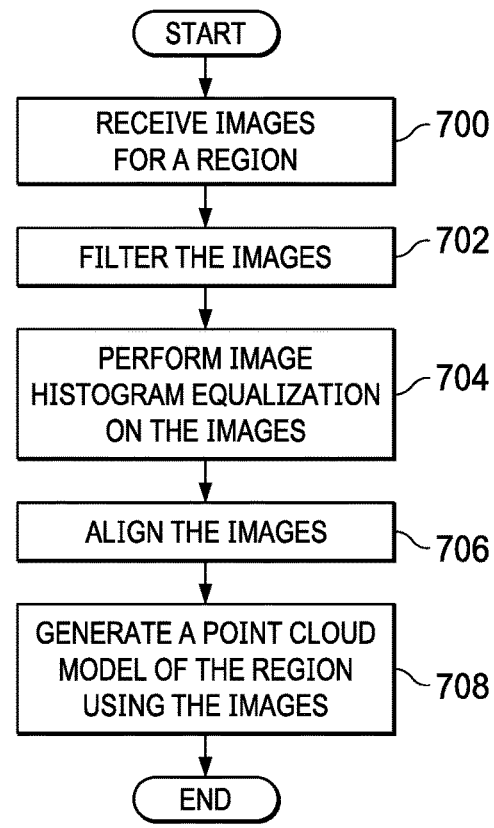
FIG. 7 is an illustration of a flowchart of a process for generating a model of a region using images in accordance with an illustrative embodiment.

Turning to FIG. 7, an illustration of a flowchart of a process for generating a model of a region using images is depicted in accordance with an illustrative embodiment. The process in FIG. 7 can be implemented in hardware, software, or both. When implemented in software, the process can take the form of program code that is run by one or more processor units located in one or more hardware devices in one or more computer systems. For example, the process can be implemented in image processor 254 in computer system 230 to generate model 252 in FIG. 2.

The process begins by receiving images for a region (operation 700). These images can be all or some portion of the images for the region. In other words, the model can be generated through postprocessing after all of the images have been taken of the region of interest. In other illustrative examples, the images can be used to generate a model while the aircraft is flying on a flight path over the region generating images.

The process filters the images (operation 702). The filtering in operation 702 can include, for example, removing non-nadir images that do not point directly below the location. The filtering can also remove images that have a low quality. For example, if the focus of an image is less that a desired threshold, the image can be removed.

The process performs image histogram equalization on the images (operation 704). This operation is performed to have uniform or equal brightness between the images that are to be used to generate the model.

The process aligns the images (operation 706). In this example, the alignment of the images involves aligning images to each other based on features in the images. The pattern on featureless surfaces in the images can be used to provide features to align the images in operation 706. In this manner, the process can align the images having a featureless surface with each other using the pattern displayed on the featureless surface in the images. This alignment can be used to form a model such as photographic map. Further, the alignment can also include the process of ortho-rectifying the images such that the images have a uniform scale. The rectification is optional when performing the alignment in operation 706.

The process then generates a point cloud model of the region using the images (operation 708). The process terminates thereafter.

In operation 708, currently used photogrammetric techniques can be used to generate the point cloud from the images. In one illustrative example, structure from motion (SFM) techniques can be used to generate the point cloud model from the images. This technique is a computer vision technique based on the principle of photogrammetry when multiple overlapping and offset images were used to reconstruct a three-dimensional point cloud of the region. As another example, a semi global matching (SGM) technique used in computer vision can be employed to generate a point cloud model from the images.

Figure 8:
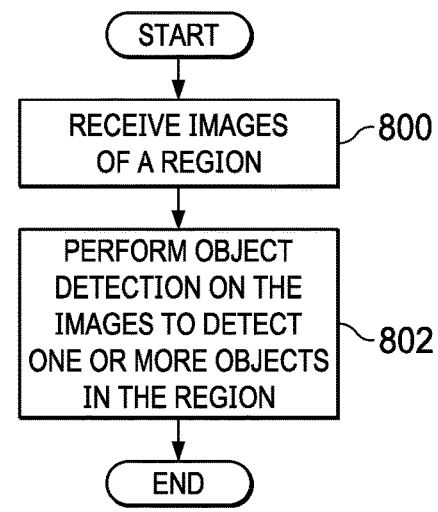
FIG. 8 is an illustration of a flowchart of a process for object detection in accordance with an illustrative embodiment.

With reference next to FIG. 8, an illustration of a flowchart of a process for object detection is depicted in accordance with an illustrative embodiment. The process in FIG. 8 can be implemented in hardware, software, or both. When implemented in software, the process can take the form of program code that is run by one or more processor units located in one or more hardware devices in one or more computer systems. For example, the process can be implemented in image processor 254 in computer system 230 to generate model 252 in FIG. 2. Image processor 254 can implement currently used object detection and object recognition processes.

The process begins by receiving images of a region (operation 800). The process performs object detection on the images to detect one or more objects in the region (operation 802). The process terminates thereafter.

In operation 802, at least one of computer vision or image processing techniques that are currently available can be used to detect the presence of objects. These objects can include at least one of a building, a car, a person, a tree, a strain, or some other suitable objects. In addition to detecting whether an object is present, the object also may be recognized as belonging to a particular class using an object recognition process. The process can be implemented in an artificial intelligence system that has been trained using machine learning techniques to recognized objects. The artificial intelligence system can also detect the presence of an object. In the illustrative examples, the processor can be in communication with a database correlating features to object type. The processor can identify the object using the information available via the database.

Figure 9:
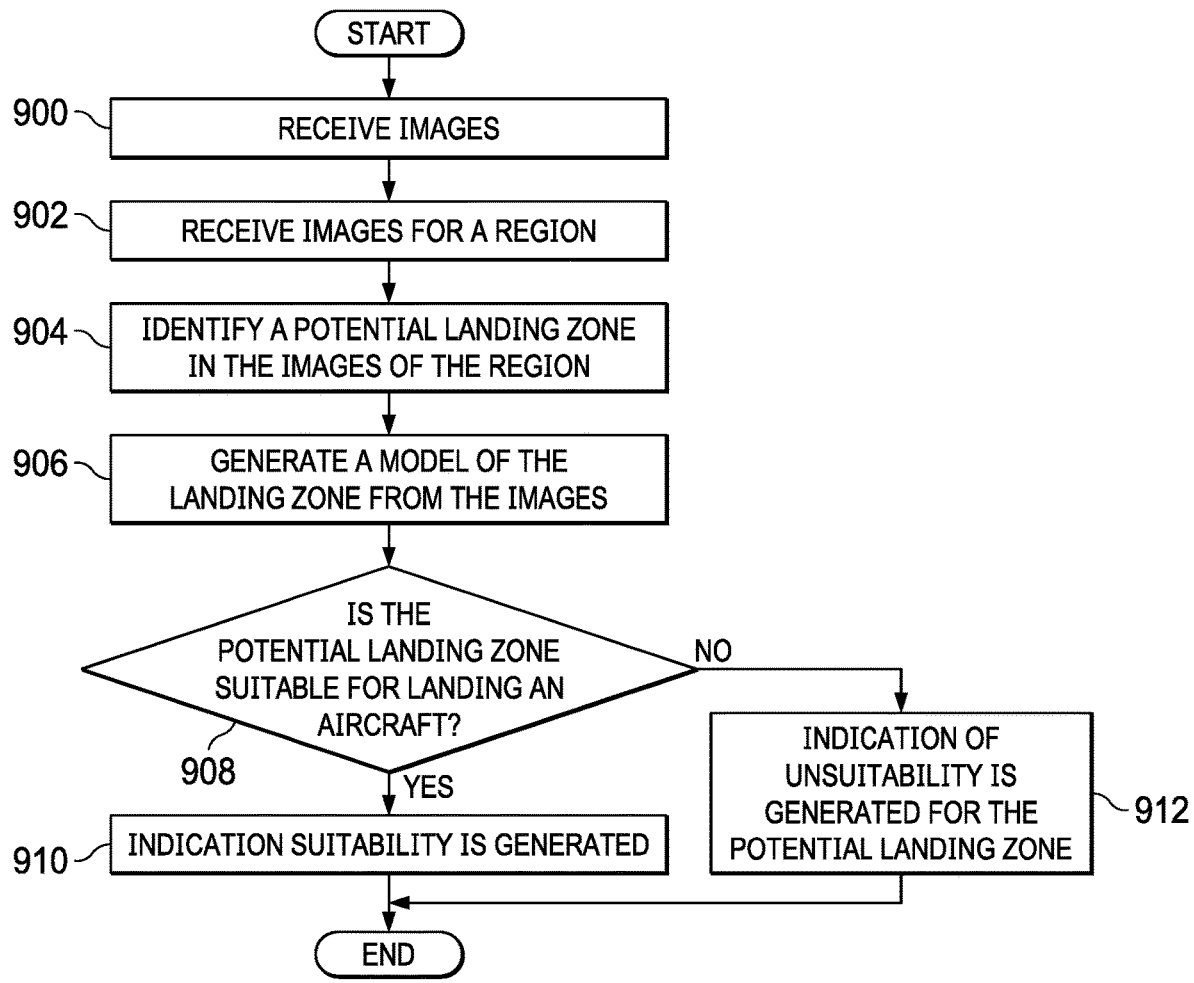
FIG. 9 is an illustration of a flowchart of a process for landing zone evaluation in accordance with an illustrative embodiment.

With reference next to FIG. 9, an illustration of a flowchart of a process for landing zone evaluation is depicted in accordance with an illustrative embodiment. The process in FIG. 9 can be implemented in hardware, software, or both. When implemented in software, the process can take the form of program code that is run by one or more processor units located in one or more hardware devices in one or more computer systems. For example, the process can be implemented in image processor 254 in computer system 230 to generate model 252 in FIG. 2.

The process begins by receiving images (operation 900). These images are for a region in which a landing zone is present for evaluation.

The process begins by receiving images for a region (operation 902). The process identifies a potential landing zone in the images of the region (operation 904). In this illustrative example, the landing zone to be evaluated in the region has a featureless surface. In other words, normally determining whether the area forming the landing zone is level enough to be suitable for landing the aircraft is difficult using current techniques. For example, operation 904 can identify a potential landing zone based on at least one of a terrain, an elevation, an uneven ground, a size, a length, or other parameters for landing requirements necessary for a particular aircraft.

The process generates a model of the landing zone from the images (operation 906). In this illustrative example the model is a point cloud model. This model of the landing zone may only include the landing zone or can include other portions of the region in addition to the landing zone.

In this example, operation 906 can be optional. In this example, the model can be used in the landing zone evaluation as an autonomous function to evaluate the potential landing zone based on information collected by the sensors. In this example, while collecting data for a region, the sensors collect sufficient information to identify the potential landing zone. For example, a featureless surface can be a viable potential landing zone because the perception system indicates that a featureless surface is present that may be a smooth surface for landing. The presence of a featureless surface, however, does not clear the region to be actually suitable for landing. For example, this featureless surface maybe smooth but may not be sufficiently flat. Thus, the region can be mapped, modeled, or both for identifying more details about the featureless surface. Upon determination of how the featureless surface is actually positioned or formed, a determination can be made as to whether the featureless surface identified as a potential landing is actually suitable using at least one of the mapping or model.

The process determines whether the potential landing zone is suitable for landing an aircraft (operation 908). This aircraft can be the aircraft generating images for another aircraft that is to use the landing zone. The determination is made by evaluating a group of parameters selected from at least one of as dimensions of the landing zone, whether an obstacle is present in the landing zone, the roughness of the landing zone and, a slope of the landing zone, or other parameters that can affect suitability of the landing zone for the aircraft. In this illustrative example, suitable parameters can be different for different types of aircraft. For example, an aircraft in the form of an unmanned quadcopter will have different requirements for suitability as compared to a manned fixed wing airplane.

If the potential landing zone is suitable, indication suitability is generated (operation 910). The process terminates thereafter. Otherwise indication of unsuitability is generated for the potential landing zone (operation 912) with the process terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware can, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

In some illustrative examples, the process in FIG. 7 can be implemented to generate other types of models from the images in addition to a point cloud model. For example, the process can be implemented with operations to generate a model such as a three-dimensional model, a contour map, a photographic map, a computer-aided design model, and other desired types of models in addition to a point cloud.

Figure 10:
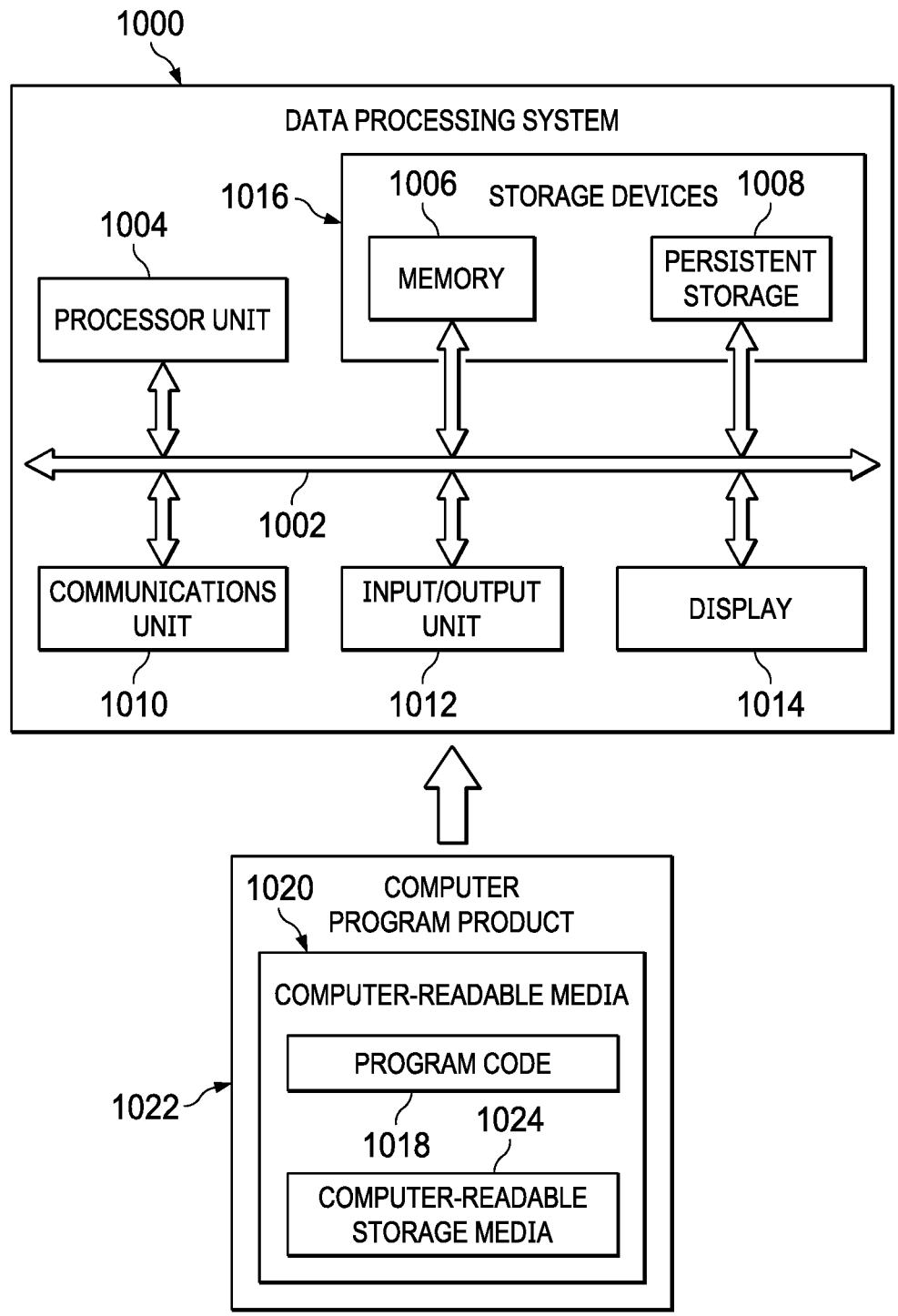
FIG. 10 is an illustration of a block diagram of a data processing system in accordance with an illustrative embodiment.

Turning now to FIG. 10, an illustration of a block diagram of a data processing system is depicted in accordance with an illustrative embodiment. Data processing system 1000 can be used to implement one or more computing devices in computer system 230 in FIG. 2 and in flight control system 306 in FIG. 3. In this illustrative example, data processing system 1000 includes communications framework 1002, which provides communications between processor unit 1004, memory 1006, persistent storage 1008, communications unit 1010, input/output (I/O) unit 1012, and display 1014. In this example, communications framework 1002 takes the form of a bus system.

Processor unit 1004 serves to execute instructions for software that can be loaded into memory 1006. Processor unit 1004 includes one or more processors. For example, processor unit 1004 can be selected from at least one of a multicore processor, a central processing unit (CPU), a graphics processing unit (GPU), a physics processing unit (PPU), a digital signal processor (DSP), a network processor, or some other suitable type of processor.

Memory 1006 and persistent storage 1008 are examples of storage devices 1016. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1016 may also be referred to as computer-readable storage devices in these illustrative examples. Memory 1006, in these examples, can be, for example, a random-access memory or any other suitable volatile or non-volatile storage device. Persistent storage 1008 can take various forms, depending on the particular implementation.

For example, persistent storage 1008 may contain one or more components or devices. For example, persistent storage 1008 can be a hard drive, a solid-state drive (SSD), a flash memory, a rewritable optical disk, a rewritable magnetic tape, or some combination of the above. The media used by persistent storage 1008 also can be removable. For example, a removable hard drive can be used for persistent storage 1008.

Communications unit 1010, in these illustrative examples, provides for communications with other data processing systems or devices. In these illustrative examples, communications unit 1010 is a network interface card.

Input/output unit 1012 allows for input and output of data with other devices that can be connected to data processing system 1000. For example, input/output unit 1012 can provide a connection for user input through at least one of a keyboard, a mouse, or some other suitable input device. Further, input/output unit 1012 can send output to a printer. Display 1014 provides a mechanism to display information to a user.

Instructions for at least one of the operating system, applications, or programs can be located in storage devices 1016, which are in communication with processor unit 1004 through communications framework 1002. The processes of the different embodiments can be performed by processor unit 1004 using computer-implemented instructions, which can be located in a memory, such as memory 1006.

These instructions are referred to as program code, computer usable program code, or computer-readable program code that can be read and executed by a processor in processor unit 1004. The program code in the different embodiments can be embodied on different physical or computer-readable storage media, such as memory 1006 or persistent storage 1008.

Program code 1018 is located in a functional form on computer-readable media 1020 that is selectively removable and can be loaded onto or transferred to data processing system 1000 for execution by processor unit 1004. Program code 1018 and computer-readable media 1020 form computer program product 1022 in these illustrative examples. In the illustrative example, computer-readable media 1020 is computer-readable storage media 1024.

In these illustrative examples, computer-readable storage media 1024 is a physical or tangible storage device used to store program code 1018 rather than a medium that propagates or transmits program code 1018.

Alternatively, program code 1018 can be transferred to data processing system 1000 using a computer-readable signal media. The computer-readable signal media can be, for example, a propagated data signal containing program code 1018. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

The different components illustrated for data processing system 1000 are not meant to provide architectural limitations to the manner in which different embodiments can be implemented. In some illustrative examples, one or more of the components may be incorporated in or otherwise form a portion of, another component. For example, memory 1006, or portions thereof, can be incorporated in processor unit 1004 in some illustrative examples. The different illustrative embodiments can be implemented in a data processing system including components in addition to or in place of those illustrated for data processing system 1000. Other components shown in FIG. 10 can be varied from the illustrative examples shown. The different embodiments can be implemented using any hardware device or system capable of running program code 1018.

Thus, illustrative examples provide a method, apparatus, and system for performing aerial imaging. In one illustrative example, a method processes images generated by an aircraft. A featureless surface is detected during at least a portion of a flight of an aircraft. A pattern is displayed in a fixed location on a featureless surface while the featureless surface is in a field of view of a camera system carried by an aircraft during at least a portion of the flight of the aircraft. The process generates images of the featureless surface with the pattern in the fixed location using the camera system during at least a portion of the flight of the aircraft.

As a result, images of the featureless surface include the pattern in a fixed location. In this manner, different images taken from different locations can be aligned with each other using features from the pattern displayed on the featureless surface. In this manner, models generated from images with a featureless surface are more accurate as compared to current techniques.

Thus, the models generated from images can be applied to many different uses. For example, models such as contour maps or point cloud models can be used for mapping and survey purposes. Further, a building can be mapped using these images. Mapping of the building can be used for architectural purposes including maintenance, restoration, additions, or improvements. The models can be generated of the regions that include structures for inspection. For example, a region can include at least one of a power line, a cell tower, a gas line, a dam, or other structures for which inspection is desired. A model of crops in fields can be used for agricultural operations such as planning, harvesting, or other operations. These and other uses can be more efficiently and accurately performed with models generated from images having a featureless surface with patterns displayed on the featureless surface in a fixed location during the generation of those images.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An aerial imaging system that comprises:
   a camera system on an aircraft, wherein the camera system comprises a field of view configured to generate images during at least a portion of a flight of the aircraft;
   a surface detector carried by the aircraft and configured to detect a featureless surface, such that all pixels of the featureless surface comprise a color or a value, for light received by the camera system, that are within a specified range of each other; and
   a laser projector system carried by the aircraft and configured to emit a group of laser beams to display a pattern that remains on a fixed location on the featureless surface during at least the portion of the flight of the aircraft when the featureless surface is in the field of view of the camera system.

2. The aerial imaging system of claim 1, further comprising:
   a controller in a computer system, wherein the controller is in communication with at least one: of the camera system, the surface detector, or the laser projector system; and
   the controller configured to control operation of at least one of: the camera system, the surface detector, or the laser projector system.

3. The aerial imaging system of claim 2, wherein the image processor ortho-rectifies the images such that the images have a uniform scale.

4. The aerial imaging system of claim 1 further comprising:
   an image processor in a computer system, wherein the image processor aligns the images with each other using the pattern displayed on the featureless surface in the images to form a photographic map.

5. The aerial imaging system of claim 3, wherein the image processor is located in at least one of a ground location or in the aircraft.

6. The aerial imaging system of claim 1, wherein the laser projector system adjusts an emission of the group of laser beams to take into account movement of the aircraft such that the pattern remains in the fixed location on the featureless surface as the aircraft moves relative to the featureless surface.

7. The aerial imaging system of claim 1, wherein the laser projector system comprises:
   a mirror system;
   a group of laser diodes directed at the mirror system; and
   a mirror controller that moves the mirror system such that the group of laser diodes emit the group of laser beams to display the pattern on the featureless surface.

8. The aerial imaging system of claim 7, wherein the mirror system comprises at least one of a micro electromechanical systems mirror or a polygonal scanning mirror.

9. The aerial imaging system of claim 1, wherein the pattern is displayed by laser projector system with a frequency that is greater than a shutter speed of the camera system.

10. An aerial imaging system that comprises:
    a controller in a computer system configured to:
       communicate with a laser projector system and a camera system,
       control operation of the laser projector system to emit a group of laser beams to display a pattern in a fixed location on a featureless surface in a field of view of the camera system during at least a portion of a flight of an aircraft, such that all pixels of the featureless surface comprise a color or a value, for light received by the camera system, that are within a specified range of each other; and
       control operation of the camera system to generate images of the featureless surface with the pattern in the field of view during at least the portion of the flight of the aircraft.

11. The aerial imaging system of claim 10 further comprising:
    a surface detector configured to communicate with the controller that identifies the featureless surface; and
    the controller configured to control operation of the laser projector system to emit the group of laser beams to display the pattern on the featureless surface in the field of view of the camera system when the featureless surface is detected by the surface detector.

12. The aerial imaging system of claim 11, further comprising the surface detector configured to detect the featureless surface before the featureless surface enters the field of view of the camera system while the aircraft moves towards the featureless surface.

13. The aerial imaging system of claim 11, further comprising the controller configured to generate surface images and determine that the surface images comprise a group of parameters within a threshold at the fixed location.

14. The aerial imaging system of claim 10, further comprising the laser projector system configured to adjust an emission of the group of laser beams to take into account movement of the aircraft such that the pattern remains in the fixed location on the featureless surface as the aircraft moves relative to the featureless surface.

15. The aerial imaging system of claim 10, further comprising the controller configured to control the laser projector system to emit the group of laser beams to display the pattern in the fixed location on the featureless surface when the featureless surface enters the field of view of the camera system during at least the portion of the flight of the aircraft.

16. The aerial imaging system of claim 10, wherein the images are for a region on a ground and further comprising an image processor configured to generate a model of the region using the images.

17. The aerial imaging system of claim 16, further comprising the image processor configured to generate at least one of a map or a point cloud model using the images.

18. The aerial imaging system of claim 16, further comprising the image processor configured to identify a landing zone in the region for landing the aircraft using the model.

19. The aerial imaging system of claim 10, further comprising an image processor configured to identify an object based upon the images and an object recognition process.

20. A method for processing images, the method comprising:
 detecting a featureless surface during at least a portion of a flight of an aircraft;
 displaying a pattern in a fixed location on the featureless surface while the featureless surface is in a field of view of a camera system carried by the aircraft during at least the portion of the flight of the aircraft, such that all pixels of the featureless surface comprise a color or a value, for light received by the camera system, that are within a specified range of each other; and
 generating images of the featureless surface with the pattern in the fixed location using the camera system during at least the portion of the flight of the aircraft.

21. The method of claim 20, wherein detecting the featureless surface during at least the portion of the flight of the aircraft comprises:
 detecting a presence of the featureless surface prior to the featureless surface entering the field of view of the camera system during at least the portion of the flight of the aircraft.

22. The method of claim 20 further comprising:
 identifying an object in a model using the images and an object recognition process.

23. The method of claim 20, further comprising:
 the images being of a region on a ground; and
 generating a model of the region using the images.

24. The method of claim 23, wherein generating the model of the region using the images comprises generating at least one of a map or a point cloud model using the images.

25. The method of claim 23 further comprising identifying, using the model, a landing zone in the region for landing the aircraft.

26. The method of claim 20 further comprising aligning, using the pattern, the images of the featureless surface with each other.

27. The method of claim 20, wherein the pattern is displayed using a group of laser beams with a frequency that is greater than a shutter speed of the camera system.

* * * * *